H. E. LEE.
RULE.
APPLICATION FILED OCT. 5, 1914.
1,150,276.
Patented Aug. 17, 1915.
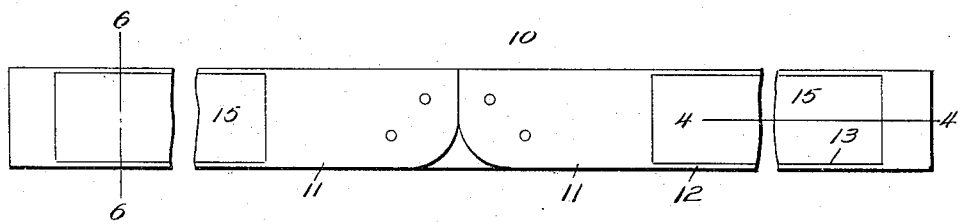
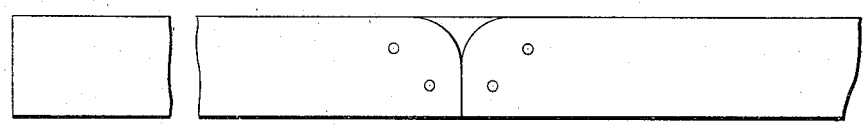
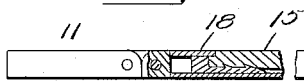
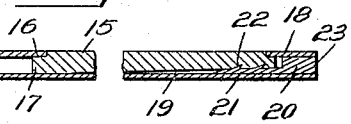
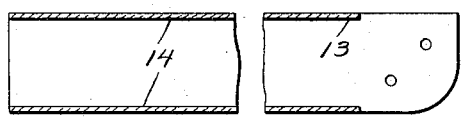
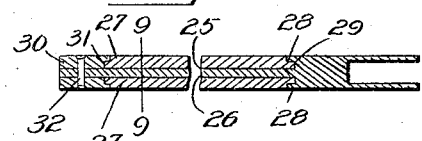
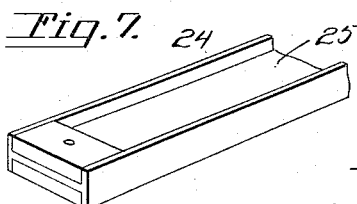
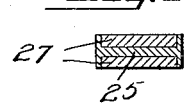
Inventor
Harry E. Lee.
By Victor J. Evans
Attorney
Witnesses

UNITED STATES PATENT OFFICE.

HARRY E. LEE, OF OAKLAND, CALIFORNIA.

RULE.

1,150,276.     Specification of Letters Patent.     Patented Aug. 17, 1915.

Application filed October 5, 1914. Serial No. 865,175.

*To all whom it may concern:*

Be it known that I, HARRY E. LEE, a citizen of the United States, residing at Oakland, in the county of Alameda and State of California, have invented new and useful Improvements in Rules, of which the following is a specification.

An object of the invention is to provide a rule consisting of few parts that can be readily assembled and in which the scale or graduated pieces are effectively secured to the rule body and will present a neat and effective appearance.

The invention contemplates, among other features, the provision of a rule commonly known as a carpenter's rule or pocket rule, and which comprehends sections forming the rule body, said sections having the scale pieces secured thereto in a novel manner so as to insure accuracy in the alining parts of the rule and result in the rule having a neat and effective appearance.

Still further objects of the invention reside in a rule in which the scale pieces are so arranged upon the body of the rule that they will fit flush with edges of the rule body and can be quickly and accurately set in place to become rigid parts thereof.

In the further disclosure of the invention reference is to be had to the accompanying drawings, constituting a part of this specification, in which similar characters of reference denote corresponding parts in all the views, and in which:

Figure 1 is a fragmentary plan view of the rule, looking at the front; Fig. 2 is a fragmentary plan view of the rule, looking at the back; Fig. 3 is a fragmentary vertical longitudinal sectional view showing the manner of attaching the scale pieces to the body of the rule; Fig. 4 is a vertical longitudinal sectional view taken on the line 4—4 in Fig. 1; Fig. 5 is a fragmentary plan view of one of the sections with the scale piece removed; Fig. 6 is a vertical transverse sectional view taken on the line 6—6 in Fig. 1; Fig. 7 is a fragmentary perspective view of a modified form of rule body; Fig. 8 is a vertical longitudinal sectional view taken through the structure shown in Fig. 7; and Fig. 9 is a vertical transverse sectional view taken on the line 9—9 in Fig. 8.

Referring more particularly to the views, the rule body is indicated by the numeral 10 and preferably consists of hingedly connected sections 11 which may be inner or end sections as desired. Each section 11 consists of a member 12 having a longitudinal groove 13 in its face, the member being substantially channel shaped so that sides 14 of the member will provide guides and form walls of the groove to permit of the insertion of a scale piece 15 into the groove of the rule body.

The scale piece may be made of metal, wood, ebony, vulcanite or any other desired substance, and preferably has each end cut away as at 16 to provide a reduced portion 17. A cross piece 18 preferably formed with the rule body is provided at the end of each section and each scale piece is of less thickness at one end than at the other end, this being clearly shown in Fig. 4 and wherein it will be seen that the under side 19 of the scale piece is tapered toward one end, thus providing a thick end and a thin end.

In the application of the scale piece to the section, the thin end of the scale piece is inserted into the section so that the thin end of the scale piece will be received in the section between the body of the section and the cross piece 18, thus permitting of inserting the entire scale piece into the groove of the section, after which the scale piece is slid backwardly so that the reduced portion of the thick end will extend beneath the other cross piece of the section and form a joint with the cross piece, whereby the upper face of the scale piece at the inner end will lie flush with the upper face of the cross piece, as shown in Fig. 4. When this has been accomplished it will be seen that the thin end will have its cut away portion so arranged that the insertion of a securing block 20 into the outer end of the section to lie between the body of the section and the cross piece and extend into the groove, will cause the thin end of the cross piece to be raised so that the reduced portion of the thin end will fit against the inner edge of the cross piece and cause the thin end of the scale piece to have its upper face lie flush with the face of the cross piece of the outer end of the section. To this end, the securing block is formed with a tongue 21 having a series of upwardly projecting inclined teeth 22, said tongue being adapted to be of a somewhat wedge shaped construction so that when it is forced into the outer end of the section it will bear against the under side of the thin end of the scale piece and thus raise the thin end to compensate for the taper of the thin end, as shown in Fig. 4. At the same time, the insertion of the securing block into the groove and between the cross piece and body of the section at its outer end will cause the teeth 22 to extend into the under side of the thin end of the scale piece and thus bind the block, whereby its end face 23 will fit flush with the transverse edges of the cross piece and section to provide a tight and solid end, as shown.

It will be clearly seen that when the section, securing block and scale piece have been constructed as set forth the assembling of the parts is a simple matter and comprehends simply the insertion of the thin end of the scale piece into the outer end of the groove of the section, after which the scale piece is moved backwardly to have its thick end received in the inner end of the groove and extend beneath the cross piece at the inner end of the section. The securing block is then driven into place by inserting the same into the outer end of the section, thus causing the reduced thin end of the scale to bear against the cross piece at the outer end of the section and thereby rigidly secure the scale piece in position and lock the same in the groove of the section.

In Figs. 7 to 9 inclusive I show a modified form of section, and in which instance the section is indicated by the numeral 24 and forms one of the parts of the rule body, said section in this construction being of substantially an I-shaped configuration in cross section, as shown in Fig. 9, so as to provide an upper groove and a lower groove indicated by the numerals 25 and 26, respectively. Into these grooves scale pieces 27 substantially similar to the scale piece 15, are adapted to be arranged as shown in Fig. 8, the inner end of the section 24 being formed with a cross piece 28, one for the upper groove and one for the lower groove, and beneath which a reduced end 29 of the scale piece is inserted. A cross piece 30 is then placed upon the outer end of the section to receive thereunder the reduced end 31 and which is the other end of the scale piece, a rivet or other convenient securing member 32 being then passed transversely through the cross pieces 31 at the outer end of the section to hold the outer ends of the cross pieces in rigid engagement with the section so that their faces will lie flush with the faces of the cross pieces.

Thus the scale pieces will be arranged upon the section of the rule body, with their edges and faces flush with the edges and faces of the section and the cross pieces thereon and, as set forth in Figs. 7 to 9 inclusive, a scale piece is arranged on each side of the section and will have its inner face bearing against the solid medial portion of the section, and which extends longitudinally of said section.

From the foregoing description it will be seen that there is provided a simple construction which permits of readily applying the scale pieces to the sections of the rule body and which can be readily adapted to the sections to present a neat and effective appearance, and result in the desired straight edges and joints having their edges fitting flush with each other and wherein scale pieces of various materials can be used in connection with the sections of the rule body when they are cut and formed as set forth.

It will be understood that I do not limit myself to the particular constructions set forth; that various changes may be made without departing from the spirit of the invention and that the scope of the invention is defined by the appended claims.

Having thus described my invention, I claim:

1. In a rule, a section having a longitudinal groove, a scale piece in the groove and having reduced ends, and means overlapping the reduced ends of the scale piece for holding the same in the groove, said means having faces flush with the face of the scale piece.

2. In a rule, a grooved section, a scale piece in the groove of the section, said scale piece having reduced ends, cross pieces overlapping the reduced ends of the scale piece, with the faces of the cross pieces lying flush with the face of the scale piece, and means bearing against the scale piece for holding the same against removal from the sections.

3. In a rule, a grooved section, a scale piece in the groove of the section, and means extending into the groove of the section and bearing against the under side of the scale piece to secure the same in the section and have its face flush with faces of the section.

4. In a rule, a grooved section, a scale piece in the groove of the section, said scale piece being thinner at one end than at the other, and means extending into the groove of the section and engaging the thin end of the scale piece to secure the scale piece against removal from the groove of the section.

5. In a rule, a grooved section, a scale piece in the groove of the section, said scale piece being thinner at one end than at the other, and a securing block extending into the groove of the section and engaging the thin end of the scale piece to secure the scale piece against removal from the groove of the section.

6. In a rule, a section, a scale piece on the section, a securing block applied to said section, and a tongue projecting from said securing block and engaging said scale piece to hold the same against removal from the said section.

7. In a rule, a section, a scale piece on the section, a securing block applied to said section, a tongue projecting from said securing block and engaging said scale piece to hold the same against removal from the said section, and teeth projecting from the tongue and engaging the scale piece.

8. In a rule, a grooved section, a scale piece in the groove of the section and having a thick end and a thin end, and means engaging said scale piece at its thin end to hold said scale piece against removal from said section.

9. In a rule, a grooved section, a scale piece in the groove of the section and having a thick end and a thin end, and means engaging said scale piece at its thin end to hold said scale piece against removal from said section, whereby the edges of the scale piece will lie flush with the edges of said section.

10. In a rule, a grooved section, a scale piece in the groove of the section and having a thick end and a thin end, and a securing block engaging the scale piece to hold the same against removal from the section.

11. In a rule, a grooved section, a scale piece in the groove of the section and having a thick end and a thin end, a securing block engaging the scale piece to hold the same against removal from the section, and a toothed tongue extending from said securing block and bearing against the scale piece.

12. In a rule, a grooved section, a scale piece having a thick end and a thin end and provided with reduced ends, with said scale piece lying in the groove of the section and having its reduced portions extending beneath portions of the section, and means on the section and engaging the scale piece to hold the same against removal from the section.

13. In a rule, a grooved section, a scale piece having a thick end and a thin end and provided with reduced ends, with said scale piece lying in the groove of the section and having its reduced portions extending beneath portions of the section, and a securing block on the section and engaging the scale piece to hold the same against removal from the section.

In testimony whereof I affix my signature in presence of two witnesses.

HARRY E. LEE.

Witnesses:
F. A. HOSTER,
E. EDMONSTON, Jr.